United States Patent
Ahn et al.

(10) Patent No.: US 10,210,350 B2
(45) Date of Patent: Feb. 19, 2019

(54) ELECTRONIC DEVICE AGAINST SIDE CHANNEL ATTACKS

(71) Applicant: Samsung Electronics Co., Ltd., Suwon-si, Gyeonggi-do (KR)

(72) Inventors: Kyoung-Moon Ahn, Seoul (KR); Jong-Hoon Shin, Hwaseong-si (KR); Ki-Seok Bae, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 164 days.

(21) Appl. No.: 15/219,271

(22) Filed: Jul. 25, 2016

(65) Prior Publication Data
US 2017/0046537 A1 Feb. 16, 2017

(30) Foreign Application Priority Data
Aug. 10, 2015 (KR) ........................ 10-2015-0112429

(51) Int. Cl.
| | |
|---|---|
| *G06F 21/75* | (2013.01) |
| *G06F 21/71* | (2013.01) |
| *G06F 21/50* | (2013.01) |
| *G06F 7/58* | (2006.01) |
| *G06F 13/42* | (2006.01) |

(52) U.S. Cl.
CPC .............. *G06F 21/71* (2013.01); *G06F 7/588* (2013.01); *G06F 13/4282* (2013.01); *G06F 21/50* (2013.01); *G06F 21/75* (2013.01); *G06F 21/755* (2017.08)

(58) Field of Classification Search
None
See application file for complete search history.

(56) References Cited

U.S. PATENT DOCUMENTS

| | | | |
|---|---|---|---|
| 6,064,740 A | 5/2000 | Curiger et al. | |
| 6,419,159 B1 | 7/2002 | Odinak | |
| 6,804,782 B1 * | 10/2004 | Qiu ........................ | G06F 9/3001 |
| | | | 380/30 |
| 6,848,619 B1 | 2/2005 | Leydier | |
| 7,065,669 B2 | 6/2006 | Cheung et al. | |
| 7,907,722 B2 | 3/2011 | Timmermans | |
| 8,539,210 B2 * | 9/2013 | Julicher .................. | G06F 9/461 |
| | | | 712/228 |
| 8,819,609 B2 | 8/2014 | Lisart et al. | |
| 8,914,563 B2 | 12/2014 | Martin et al. | |
| 9,213,835 B2 * | 12/2015 | Lesea .................... | G06F 21/755 |
| 2003/0223580 A1 * | 12/2003 | Snell ...................... | H04L 9/003 |
| | | | 380/28 |
| 2004/0107388 A1 * | 6/2004 | Konishi .............. | G06F 13/4077 |
| | | | 714/43 |
| 2006/0036779 A1 | 2/2006 | Kim et al. | |

(Continued)

*Primary Examiner* — Malcolm Cribbs
(74) *Attorney, Agent, or Firm* — Renaissance IP Law Group LLP

(57) ABSTRACT

An embodiment includes an electronic device, comprising: a control intellectual property (IP) including a plurality of first special function registers (SFRs); a basic operation IP including a plurality of second SFRs and coupled to the control IP through a first path and a second path; and a random number generator configured to generate a random signal; wherein the control IP is configured to: select one of the first path and the second path based on the random signal; and set the second SFRs using the selected path.

19 Claims, 10 Drawing Sheets

(56) References Cited

U.S. PATENT DOCUMENTS

| | | | |
|---|---|---|---|
| 2006/0036833 A1* | 2/2006 | Piry | G06F 9/30058 |
| | | | 712/200 |
| 2006/0155962 A1* | 7/2006 | Piry | G06F 9/30058 |
| | | | 712/214 |
| 2007/0288762 A1* | 12/2007 | Dale | G06F 9/4406 |
| | | | 713/189 |
| 2008/0126766 A1* | 5/2008 | Chheda | G06F 9/30003 |
| | | | 712/226 |
| 2009/0003598 A1* | 1/2009 | Itoh | H04L 9/003 |
| | | | 380/46 |
| 2009/0313461 A1 | 12/2009 | Klug | |
| 2010/0223434 A1* | 9/2010 | Dupaquis | G06F 9/30043 |
| | | | 711/154 |
| 2011/0013769 A1* | 1/2011 | Itoh | H04L 9/003 |
| | | | 380/28 |
| 2013/0007881 A1* | 1/2013 | Liem | G06F 21/14 |
| | | | 726/22 |
| 2013/0054991 A1* | 2/2013 | Kaluzhny | G06F 7/00 |
| | | | 713/320 |
| 2013/0198500 A1 | 8/2013 | Bowling | |
| 2014/0053003 A1* | 2/2014 | Moyer | G06F 21/556 |
| | | | 713/300 |
| 2014/0126285 A1* | 5/2014 | Kang | G11C 16/26 |
| | | | 365/185.2 |
| 2014/0139532 A1 | 5/2014 | Sandmel et al. | |
| 2014/0164726 A1* | 6/2014 | Lee | G11C 29/023 |
| | | | 711/167 |
| 2014/0237284 A1* | 8/2014 | Fine | G06F 21/00 |
| | | | 713/340 |
| 2014/0298452 A1* | 10/2014 | Heng | G06F 21/55 |
| | | | 726/22 |

* cited by examiner

ELECTRONIC DEVICE AGAINST SIDE CHANNEL ATTACKS

CROSS-REFERENCE TO RELATED APPLICATION(S)

This application claims the benefit of priority under 35 U.S.C. § 119 to Korean Patent Application No. 10-2015-0112429, filed on Aug. 10, 2015 and Korean Patent Application No. 10-2015-0134291, filed on Sep. 23, 2015 in the Korean Intellectual Property Office (KIPO), the contents of each of which are herein incorporated by reference in their entirety.

BACKGROUND

1. Technical Field

Embodiments relate to an electronic device, and more particularly to security of an electronic device.

2. Description of the Related Art

Recently, an electronic system, such as a mobile device, performs various kinds of functions using security data such as personal information, a cryptographic key, or the like. If the electronic system is attacked while the security data are transferred between elements of the electronic system, the security data may be compromised.

SUMMARY

An embodiment includes an electronic device, comprising: a control intellectual property (IP) including a plurality of first special function registers (SFRs); a basic operation IP including a plurality of second SFRs and coupled to the control IP through a first path and a second path; and a random number generator configured to generate a random signal; wherein the control IP is configured to: select one of the first path and the second path based on the random signal; and set the second SFRs using the selected path.

An embodiment includes an electronic device, comprising: a bus; a control intellectual property (IP) including a plurality of first special function registers (SFRs); and a basic operation IP including a plurality of second SFRs and coupled to the control IP through a bus and a direct setting path directly connected to the control IP and separate from the bus; wherein the control IP is configured to set functions of the second SFRs through the direct setting path.

An embodiment includes an electronic device, comprising: a control intellectual property (IP) including a plurality of first special function registers (SFRs); a basic operation IP including a plurality of second SFRs and coupled to the control IP through a first path and a second path; and a random number generator configured to generate a random signal; wherein the control IP is configured to: select at least one of the first path and the second path based on the random signal; and set the second SFRs using the selected at least one of the first path and the second path.

BRIEF DESCRIPTION OF THE DRAWINGS

Illustrative, non-limiting embodiments will be more clearly understood from the following detailed description in conjunction with the accompanying drawings.

DETAILED DESCRIPTION OF THE EMBODIMENTS

Figure 1:
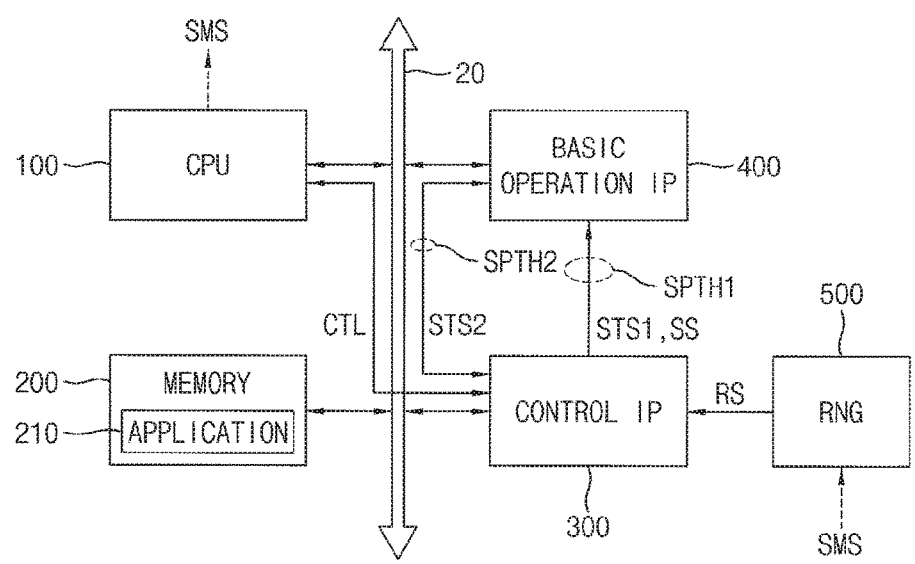
FIG. 1 is a block diagram illustrating an electronic device according to some embodiments.

Various embodiments will be described more fully with reference to the accompanying drawings, in which particular embodiments are shown. Embodiments may, however, take many different forms and should not be construed as limited to the particular embodiments set forth herein. Rather, these embodiments are provided so that this disclosure will be thorough and complete, and will fully convey the scope to those skilled in the art. Like reference numerals refer to like elements throughout this application.

It will be understood that, although the terms first, second, etc. may be used herein to describe various elements, these elements should not be limited by these terms. These terms are used to distinguish one element from another. For example, a first element could be termed a second element, and, similarly, a second element could be termed a first element, without departing from the scope. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a similar fashion.

The terminology used herein for the purpose of describing particular embodiments and is not intended to be limiting of all embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram illustrating an electronic device according to some embodiments. Referring to FIG. 1, an electronic device 10a may include central processing unit (CPU) 100, a memory 200, a control intellectual property (IP) 300, a basic operation IP 400 and a random number generator 500.

The CPU 100, the memory 200, the control IP and the basic operation IP 400 may be connected with one another through a system bus 20. In a related art, the term "Intellectual Property (IP)", which is a design asset employed in the semiconductor architecture and fabrication, is a predetermined function block to be implemented in a semiconductor device, e.g., a System on Chip (SOC). Throughout the specification of the embodiments, an IP is defined as a discrete circuit block configured to perform a particular function in the semiconductor device. An IP may include analog circuits, digital circuits, input/output circuits, memory circuits, registers, processing cores, or the like coupled together and configured to implement the particular function.

The CPU 100 may be configured to control overall operation of the electronic device 10a. For example, the CPU 100 may be configured to directly/indirectly control operations of the memory 200, the control IP 300 and the basic operation IP 400.

The CPU 100 may be configured to execute an application 210 stored in the memory 120. The CPU 100 may be configured to control or set special function registers SFRs of the control IP 300 to control the operation of the electronic device 10a using a control signal CTL. The CPU 100 may be implemented, for example, by a single-core or a multi-core processor. The multi-core processor includes a single computing component with two or more independent cores.

The memory 200 may store the application 210. The memory 200 may be implemented by a volatile memory, non-volatile memory, or a combination of volatile and non-volatile memory. The memory 200 may include different types of volatile memory and/or different types of non-volatile memory. The memory 200 may include multiple volatile and/or non-volatile memory devices. The volatile memory may include, for example, dynamic random access memory (DRAM), static RAM (SRAM), thyristor RAM (T-RAM), zero capacitor RAM (Z-RAM), twin transistor RAM (TTRAM), or the like. The non-volatile memory may include, for example, electrically erasable programmable read-only memory (EEPROM), flash memory, magnetic RAM (MRAM), spin-transfer torque MRAM, conductive bridging RAM (CBRAM), ferroelectric RAM (FeRAM), phase-change RAM (PRAM), resistive RAM (RRAM), nanotube RRAM, polymer RAM (PoRAM), nano floating gate memory (NFGM), holographic memory, molecular electronic memory device, insulator resistance change memory, or the like.

The application 210 is executed according to the control of the CPU 100. The application 210 may control the operation of the electronic device 10a.

The random number generator 500 may be configured to generate a random signal RS and provides the random signal RS to the control IP 300.

The control IP 300 may be configured to set functions of the SFRs by randomly selecting at least one of a first setting path SPTH1 directly connected to the basic operation IP 400 and a second setting path SPTH2 connected to the basic operation IP 400 via the system bus 20, in response to the random signal RS. The control IP 300 may be configured to provide the basic operation IP 400 with a first setting signal STS1 and a selection signal SS through the first setting path SPTH1. The control IP 300 may be configured to provide the basic operation IP 400 with a second setting signal STS2 through the second setting path SPTH2. The first setting path SPTH1 may be also referred to as a first setting path and the second setting path SPTH2 may be also referred to as a second setting path.

In some embodiments, the control IP 300 is configured to randomly select one of the first setting path SPTH1 and the second setting path SPTH2. That is, values for the SFRs may be provided over either the first setting path SPTH1 or the second setting path SPTH2 and the selection of the particular path is performed in response to the random signal RS.

In other embodiments, the control IP 300 is configured to randomly select one of the first setting path SPTH1, the second setting path SPTH2, and both the first setting path SPTH1 and the second setting path SPTH2. That is, in addition to using only the first setting path SPTH1 or only the second setting path SPTH2, the functions of the SFRs may be set using both the first setting path SPTH1 and the second setting path SPTH2. In some embodiments the selection signal SS may still be used to indicate a particular path; however, in other embodiments the selection signal SS may also be changed randomly in response to the random signal RS.

The basic operation IP 400 may be configured to set SFRs therein according to the first setting signal STS1 or the second setting signal STS2 and perform a basic operation such as addition, subtraction, multiplication, or a combination of such operations or similar operations. The basic operation IP 400 may be configured to perform a basic operation constituting a public key algorithm such as Rivest-Shamir-Adleman (RSA) algorithm, which is based on the difficulty of factoring large integers, and ecliptic curve cryptography (ECC), which is based on the difficulty of finding the discrete logarithm of a random elliptic curve element with respect to a publicly known base point, known as the elliptic curve discrete logarithm problem (ECDLP). That is, the basic operation IP 400 may perform an encryption and decryption on secure data by performing the public key algorithm. While some examples of techniques that may be used for encryption and decryption, other techniques and/or algorithms may be used.

When the control IP 300 sets the function of SFRs in the basic operation IP 400 by randomly selecting at least one of the first setting path SPTH1 and the second setting path SPTH2 in response to the random signal RS, power pattern of the basic operation IP 400, which is generated when the basic operation IP 400 performs the basic operation, may be randomized and thus the electronic device 10a may cope with external side channel attacks.

Figure 2:
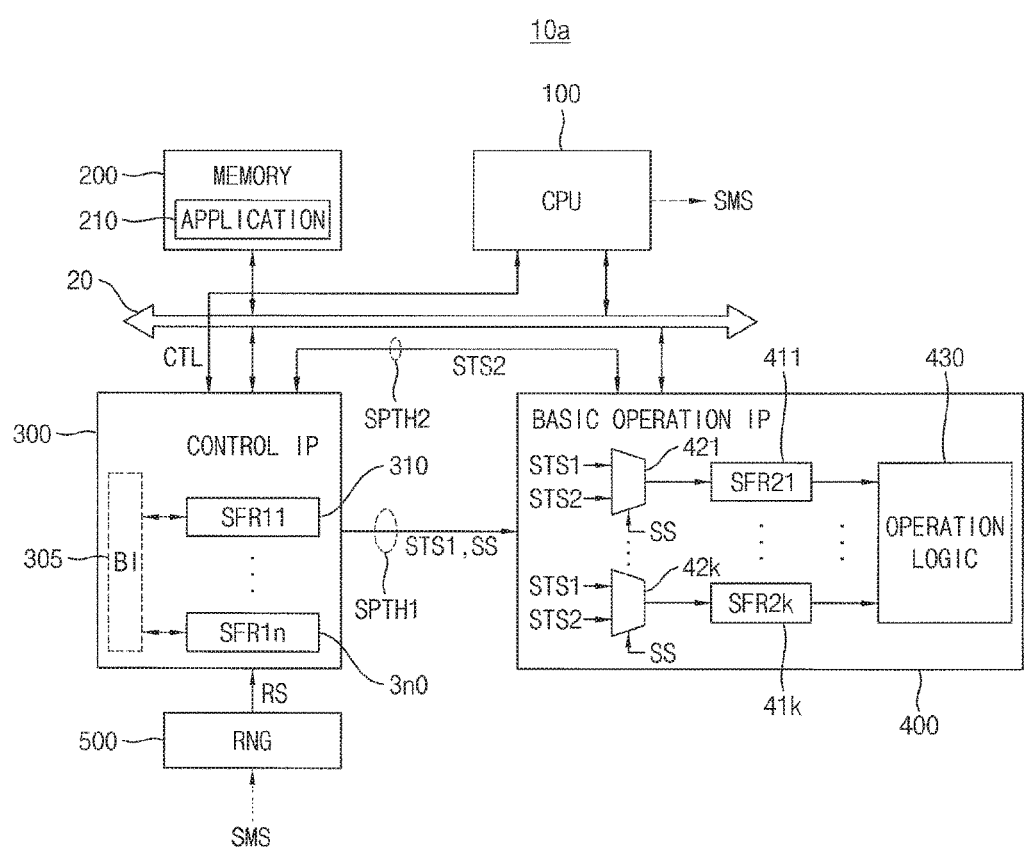
FIG. 2 illustrates the control IP and the basic operation IP in detail in the electronic device of FIG. 1 according to some embodiments.

FIG. 2 illustrates the control IP and the basic operation IP in detail in the electronic device of FIG. 1 according to some embodiments. Referring to FIG. 2, the control IP 300 includes multiple first SFRs 310~3n0 and a bus interface 305, where n is an integer greater than one. The basic operation IP 400 includes multiple second SFRs 411~41k, multiple multiplexers 421~42k and n operation logic 430, where k is an integer greater than one. In some embodiments, either or both of n and k may be integers greater than 9.

Each of the first SFRs 310~3n0 and each of the second SFRs 411~41k may be configured to store data for performing a particular function of a corresponding IP. For example, each of the first SFRs 310~3n0 and each of the second SFRs 411~41k may be configured to be used as an input/output (I/O) control register, a timer, a stack pointer, a program counter, a return address register, a status register, or a condition code register, but embodiments are not limited thereto.

The bus interface 305 may be configured to convert the control signal CTL from the CPU 100 to internal control signals conforming to a bus protocol and store the internal control signals in the first SFRs 310~3n0. The first SFRs 310~3n0 may be configured to provide the basic operation IP 400 with the first setting signal STS1 and the selection signal SS through the first setting path SPTH1 and provide the basic operation IP 400 with the second setting signal STS2 through the second setting path SPTH2 according to set value or data stored therein.

The first SFRs 310~3n0 may be configured to randomly select one of the first setting path SPTH1 and the second setting path SPTH2 in response to the random signal RS from the random number generator 500. For example, when the random signal RS includes one or more random bits and a random bit has a first logic level, the first SFRs 310~3n0 may be configured to provide the basic operation IP 400 with the first setting signal STS1 and the selection signal SS through the first setting path SPTH1. In addition, when the random bit has a second logic level, the first SFRs 310~3n0 may be configured to provide the basic operation IP 400 with the second setting signal STS2 through the second setting path SPTH2. Therefore, use of the first setting path SPTH1 is randomly determined in response to the random signal RS, and the power pattern of the basic operation IP 400, which is generated when the basic operation IP 400 performs the basic operation, may be randomized.

The first setting signal STS1 may include setting data to set functions of the second SFRs 411~41k and the second setting signal STS2 may include setting data to set a function of one of the second SFRs 411~41k and an address to designate one of the second SFRs 411~41k.

Each of the multiplexers 421~42k may be configured to select one of the first setting signal STS1 and the second setting signal STS2 in response to the selection signal SS and provide the selected setting signal to each of the second SFRs 411~41k. For example, when the random bit has a first logic level, the selection signal SS has a first logic level. Therefore, each of the multiplexers 421~42k may be configured to select the first setting signal STS1, the second SFRs 411~41k may be configured to store setting data based on the first setting signal STS1, and the operation logic 430 may be configured to perform a basic operation according to the setting data based on the first setting signal STS1.

In another example, when the random bit has a second logic level, the selection signal SS has a second logic level. Therefore, each of the multiplexers 421~42k may be configured to select the second setting signal STS2, the second SFRs 411~41k may be configured to store setting data based on the second setting signal STS2, and the operation logic 430 may be configured to perform the basic operation according to the setting data based on the second setting signal STS2.

The CPU 100 may be configured to provide the random number generator 500 with a secure mode signal SMS to selectively enable the random number generator 500. For example, when the secure mode signal SMS has a first logic level, the random number generator 500 is enabled in response to the secure mode signal SMS and provides the random signal RS to the control IP 300. The control IP 300 may be configured to randomly select one of the first setting path STS1 and the second setting path STS2 in response to the random signal RS to set the second SFRs 411~41k. The random number generator 500 may be enabled in response to the secure mode signal SMS when the electronic device 10a generates electronic signature and exchanges a cryptographic key.

In another example, when the secure mode signal SMS has a second logic level, the random number generator 500 is disabled in response to the secure mode signal SMS and does output the random signal RS to the control IP 300. When the random number generator 500 does not output the random signal RS, the control IP 300 may be configured to simultaneously set the second SFRs 411~41k through the first setting path SPTH1 to defend the electronic device 10a from the external side channel attack. The random number generator 500 may be disabled in response to the secure mode signal SMS when the electronic device 10a authenticates the electronic signature.

Figure 3:
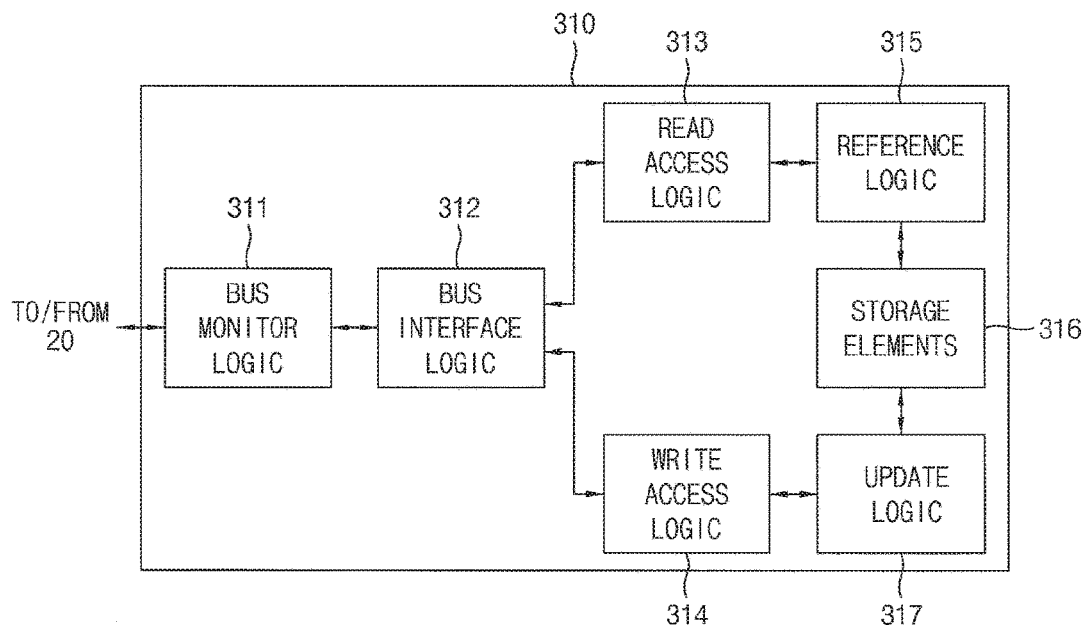
FIG. 3 is a block diagram illustrating one of the SFRs in FIG. 2 according to some embodiments.

FIG. 3 is a block diagram illustrating one of the SFRs in FIG. 2 according to some embodiments. Although in FIG. 3, a configuration of the SFR 310 is illustrated, each of other SFRs 320~3n0 and 411~41k may have substantially same or similar configuration as or to configuration of the SFR 310. Referring to FIG. 3, the SFR 310 includes bus monitor logic 311, bus interface logic 312, read access logic 313, write access logic 314, reference logic 315, storage elements 316, and update logic 317.

The read access logic 313 is configured to read the data stored in the storage elements 316. The read access logic 313 may be configured to process read accesses through a bus. Further, the read access logic 313 may be configured to transmit the data read from the storage elements 316 to the bus interface logic 312.

The write access logic 314 is configured to write data to the storage elements 316. The write access logic 314 processes write accesses through a bus. Further, the write access logic 314 may be configured to receive data to be written to the storage elements 316 from the bus interface logic 312.

The bus interface logic 312 is configured to interface between the read access logic 313 and the bus, or between the write access logic 314 and the bus. The bus interface logic 312 may include multiple logics including a first bus interface logic be configured to interface between the read access logic 313 and the bus and a second bus interface logic interfacing between the write access logic 314 and the bus 20.

The bus monitor logic 311 may be configured to perform clock gating by detecting an access of the bus 20, and when the access of the bus 20 is detected, supply clocks to the read access logic 313, the write access logic 314, or the bus interface logic 312.

When the bus 20 performs a read access to the control IP 300, the bus monitor logic 311 may be configured to supply clocks to the bus interface logic 312 and the read access logic 113. When the bus performs a write access to the control IP 300, the bus monitor logic 311 may be configured to supply clocks to the bus interface logic 312 and the write access logic 314. When an access is not performed by the bus 20, a clock is not supplied to the read access logic 313, the write access logic 314, and the bus interface logic 312.

Clocks for monitoring operations may be continuously supplied to the bus monitor logic 311. The bus monitor logic 311 corresponding to the bus interface logic 312 may consist of multiple logics. The bus monitor logic 311 may be configured to be specific to a particular bus type.

The storage elements 316 correspond to storage spaces for storing data within the SFR 310. The storage elements 316 include multiple storage cells for storing data. As an example, the storage cells may correspond to one or more flip-flops (FFs); however, in other embodiments the storage cells may include different components. The storage cells may be divided into multiple groups according to update attributes, and different types of clock gating may be applied according to the update attributes.

The reference logic 315 is configured to refer to the data stored in the storage elements 316. The reference logic 315 may be configured to access all storage cells of the storage elements 316. The reference logic 315 may be configured to supply the data stored in the storage elements 316 to the read access logic 313 or an internal logic in the control IP 300.

Figure 4:
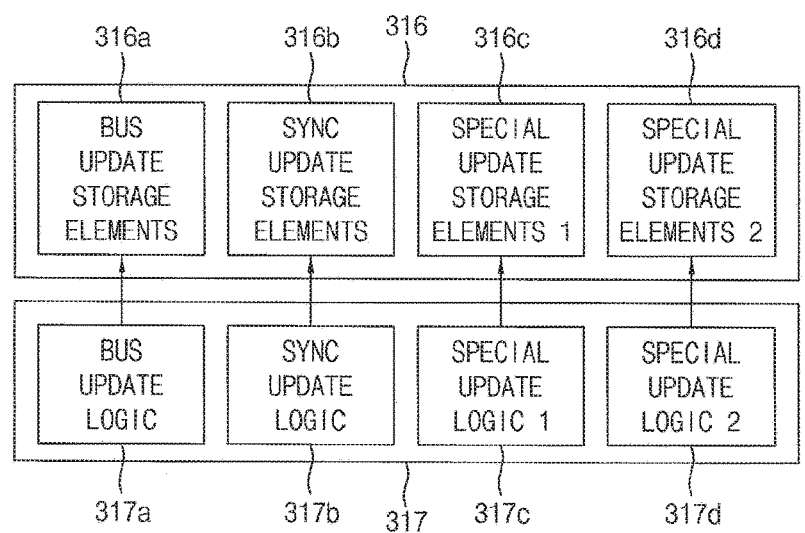
FIG. 4 is a block diagram illustrating operations of storage elements and update logic in FIG. 3.

FIG. 4 is a block diagram illustrating operations of storage elements and update logic in FIG. 3. Referring to FIG. 4, the storage elements 316 may be separated into one or more groups according to update attributes. As an example, the storage elements 316 may include a bus update storage element 316a, a sync update storage element 316b, a first special update storage element 316c, and a second special update storage element 316d.

As an example, the update logic 317 may include a bus update logic 317a, a sync update logic 317b, a first special update logic 317c, and a second special update logic 317d, corresponding to the storage elements 316.

The bus update logic 317a may be configured to update the data stored in the bus update storage element 316a, and the sync update logic 317b may be configured to update the data stored in the sync update storage element 316b. In addition, the first special update logic 317c and the second special update logic 317d may be configured to update the data stored in the first special update storage element 316c and the second special update storage element 316d, respectively.

The bus update storage element 316a may be configured to be updated according to the write access of the bus, and the sync update storage element 316b may be configured to be updated according to a sync signal, e.g., a frame sync signal. In particular, shadow registers of the control IP 300 for multimedia may be updated according to the frame sync signal.

In addition, some update storage elements may be updated with intrinsic update conditions according to the interrupt or auto-clear function.

Figure 5A:
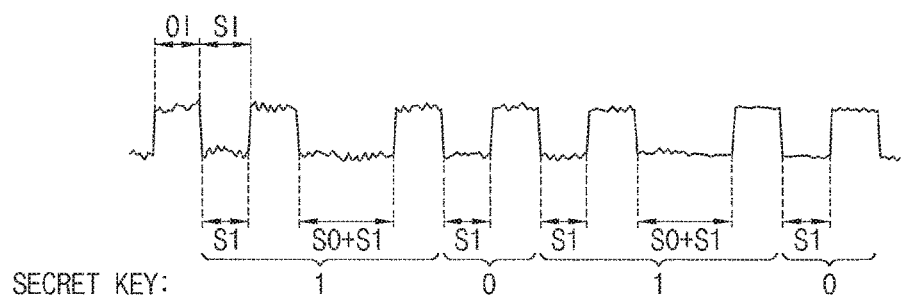
FIG. 5A illustrates an example of the power pattern of the basic operation IP.

FIG. 5A illustrates an example of the power pattern of the basic operation IP. In FIG. 5A, an example will be described where the basic operation IP is configured to perform the basic operation with the first setting path SPTH1 not being used and the second setting path SPTH2 being used in the electronic device of FIG. 2. Referring to FIG. 5A, the functions of the second SFRs 411~41k are set in a setting interval SI during which the power pattern has a lower level and the operation logic 430 performs the basic operation based on the data stored in the second SFRs 411~41k in an operation valid interval OI during which the power pattern has a higher level. Duration of the setting interval SI may be varied according to values of secret key which is processed in the operation valid interval OI. For example, S1 corresponds to an interval for setting operation SFRs and S0 corresponds to an interval for setting input SFRs in FIG. 5A. Therefore, a sum of S1 and the operation valid interval OI may correspond to a secret key of '0' and a sum of S0, S1 and the operation valid interval OI may correspond to a secret key of '1'. Therefore, values of the secret keys may be exposed through the power pattern when the first setting path SPTH1 is not used and the second setting path SPTH2 is used in the electronic device 10a of FIG. 2.

Figure 5B:
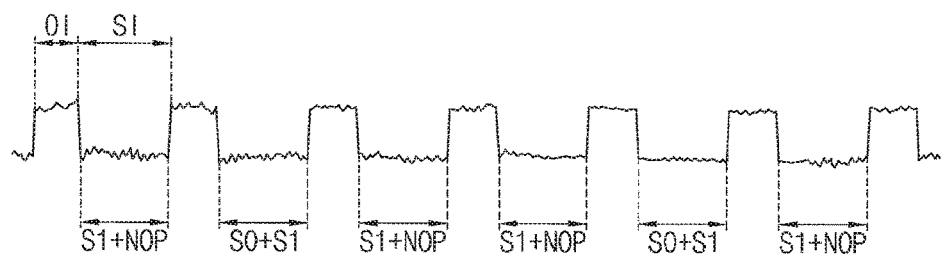
FIG. 5B illustrates an example of a countermeasure in the electronic device of FIG. 2.

FIG. 5B illustrates an example of a countermeasure in the electronic device of FIG. 2. In FIG. 5B, an example will be described where the basic operation IP performs the basic operation with the first setting path SPTH1 not being used and the second setting path SPTH2 being used in the electronic device of FIG. 2. Referring to FIG. 5B, for preventing the values of the secret keys being exposed as in FIG. 5A, the duration of the setting interval SI may be equalized by inserting a dummy setting interval NOP in the setting interval SI. When the duration of the setting interval SI is equalized, each setting interval SI between the operation valid intervals OI may have a substantially same duration.

Figure 5C:
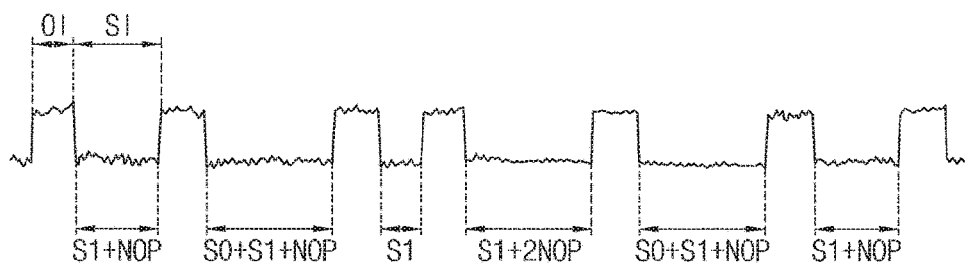
FIG. 5C illustrates another example of a countermeasure in the electronic device of FIG. 2.

FIG. 5C illustrates another example of a countermeasure in the electronic device of FIG. 2. In FIG. 5C, an example will be described where the basic operation IP performs the basic operation with the first setting path SPTH1 not being used and the second setting path SPTH2 being used in the electronic device of FIG. 2. Referring to FIG. 5C, for preventing the values of the secret keys being exposed as in FIG. 5A, the duration of the setting interval SI may be randomized by randomly inserting one or more dummy setting interval NOP in the setting interval SI. When the duration of the setting interval SI is randomized, the values of the secret keys are not exposed through the power pattern.

Figure 6:
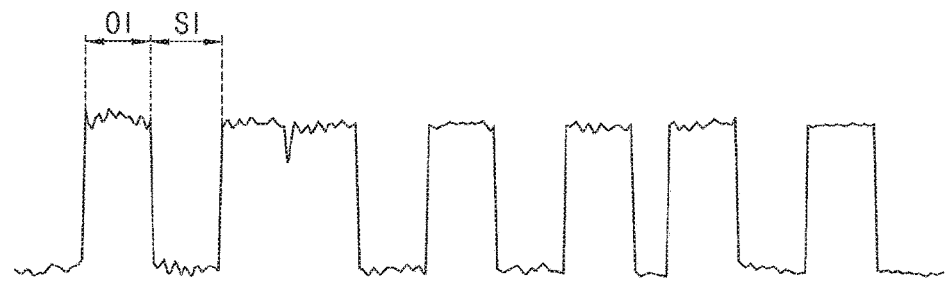
FIGS. 6 and 7 illustrate examples of the power pattern of the basic operation IP in the electronic device of FIG. 2, respectively.
Figure 7:
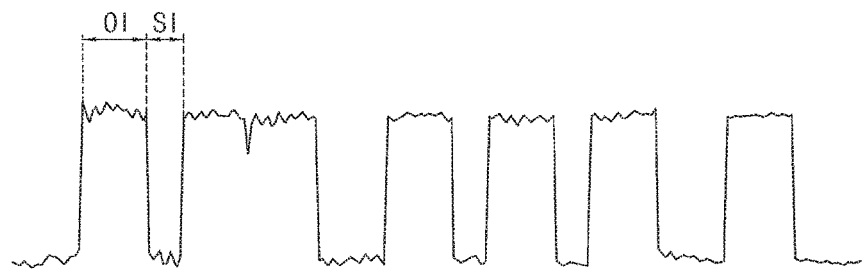

FIGS. 6 and 7 illustrate an example of the power pattern of the basic operation IP in the electronic device of FIG. 2, respectively. In FIGS. 6 and 7, an example will be described where the basic operation IP performs the basic operation with one of the first setting path SPTH1 and the second setting path SPTH2 being randomly selected in the electronic device of FIG. 2. Referring to FIGS. 2, 6 and 7, when the control IP 300 sets the functions of the second SFRs 411~41k by randomly selecting one of the first setting path SPTH1 and the second setting path SPTH2 and the operation logic 430 performs the basic operation based on the data stored in the second SFRs 411~41k, the power pattern of the basic operation IP 400 may be randomized whenever the basic operation is performed. Therefore, the values of the secret keys are not exposed to the side channel attacks.

When the same basic operation is performed, the power pattern of the basic operation IP 400 is varied according to which one of the first setting path SPTH1 and the second setting path SPTH2 is selected in response to the random signal RS as illustrated in FIGS. 6 and 7. Therefore, the values of the secret keys are not exposed to outside.

Figure 8:
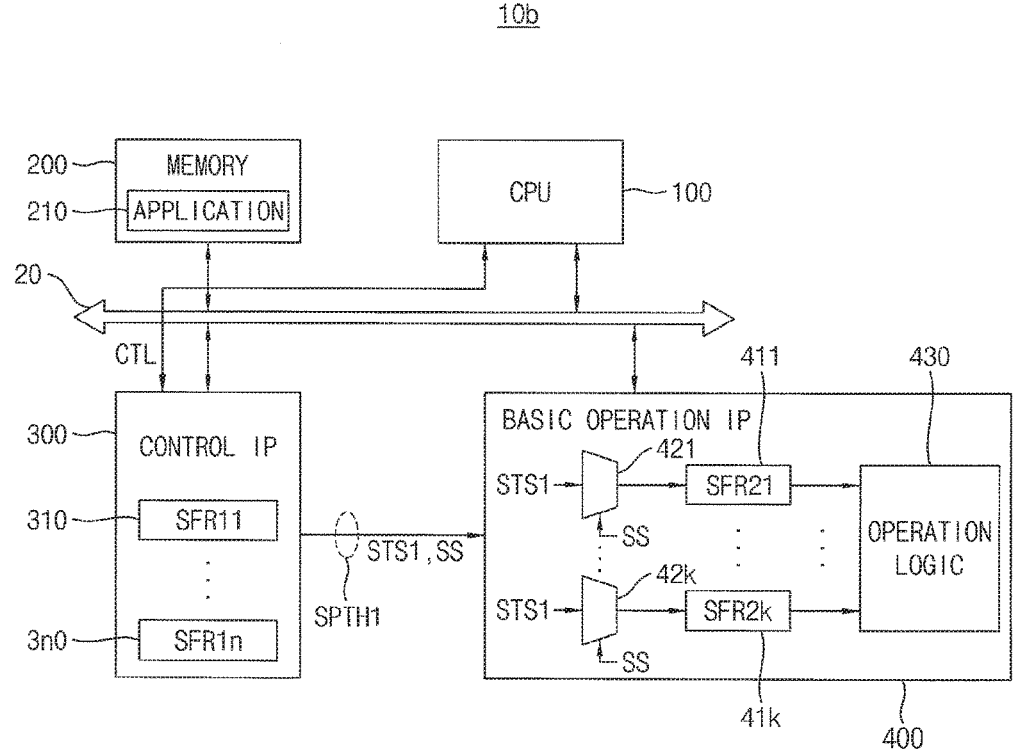
FIG. 8 is a block diagram illustrating an electronic device according to some embodiments.

FIG. 8 is a block diagram illustrating an electronic device according to some embodiments. An electronic device 10b of FIG. 8 differs from the electronic device 10 of FIGS. 1 and 2 in that the electronic device 10b of FIG. 8 does not include the random number generator 500 and in that the control IP 300 is configured to set the functions of the second SFRs 411~41k in the basic operation IP 400 through the first setting path (or, a direct setting path) SPTH1 which is directly connected to the basic operation IP 400.

The control IP 300 is configured to provide the basic operation IP 400 with the first setting signal STS1 and the selection signal SS through the first setting path SPTH1, and the multiplexers 421~42k are configured to select the first setting signal STS1 in response to the selection signal SS to output the first setting signal STS1 to the second SFRs 411~41k. Inputs of the multiplexers 421~42k, to which a setting signal is not applied, may be in a floating state. The control IP 300 may simultaneously set the functions of the second SFRs 411~41k by directly providing the first setting signal STS1 and the selection signal SS to the basic operation IP 400 through the first setting path SPTH1. Therefore, setting time required for setting the second SFRs 411~41k is reduced, and thus the basic operation IP 400 may reduce a time for required to perform a basic operation. Accordingly, performance of the electronic device 10b may be enhanced.

The configuration of the electronic device 10b of FIG. 8 may be used when the electronic device 10b authenticates the electronic signature.

In some embodiments, the basic operation IP 400 may not include the multiplexers 421~42k and the control IP 300 may directly provide the first setting signal STS1 to the second SFRs 411~41k through the first setting path SPTH1.

Figure 9:
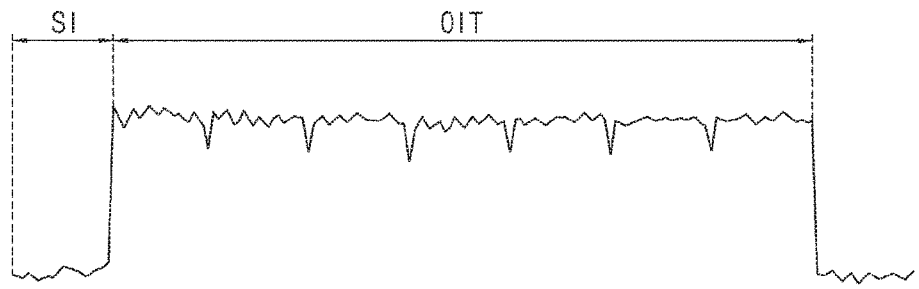
FIG. 9 illustrates an example of the power pattern of the basic operation IP when the basic operation IP performs the basic operation in the electronic device of FIG. 8.

FIG. 9 illustrates an example of the power pattern of the basic operation IP when the basic operation IP performs the basic operation in the electronic device of FIG. 8. Referring to FIGS. 8 and 9, when the first setting path SPTH1 is used, the functions of the second SFRs 411~41k are simultaneously set and the operation logic 430 consecutively performs the basic operation based on the data stored in the second SFRs 411~41k in an operation valid interval OIT. Therefore, since the operation valid interval OIT does not include the setting interval SI, the values of the secret keys are not exposed. In addition, performance of the electronic device 10b may be enhanced because a time for the operation logic 430 to perform the basic operation is reduced.

Figure 10:
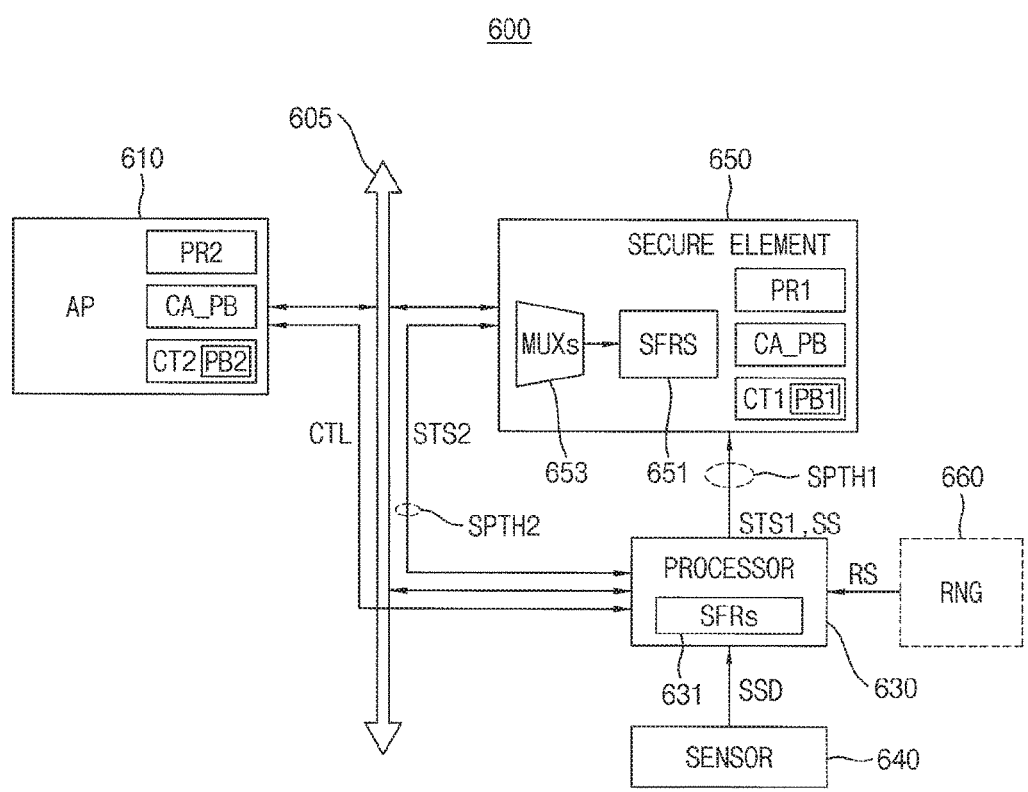
FIG. 10 is a block diagram illustrating an electronic device according to some embodiments.

FIG. 10 is a block diagram illustrating an electronic device according to some embodiments. Referring to FIG. 10, an electronic device 600 may include an application processor 610, a processor 630, a sensor 640 and a secure element 650. In some embodiments, the electronic device 600 may further include a random number generator 660.

The application processor 610, the processor 630, and the secure element 650 may be connected to with one another with a bus 605. The application processor 610 may use the CPU 100 in the electronic device 10a of FIG. 2 or may include the CPU 100 therein. The processor 630 may use the control IP 300 in the electronic device 10a of FIG. 2 and the secure element 650 may use the basic operation IP 400 in the electronic device 10a of FIG. 2.

The processor 630 may include first SFRs 631 and the secure element 650 may include multiplexers 653 and second SFRs 651. The secure element 650 may further include operation logic although not illustrated.

The secure element 650 may store a first certificate CT1, which corresponds to the secure element 650 and is issued by a certificate authority (CA), a public key CA_PB of the certificate authority, and a first private key PR1 of the secure element 650. A first public key PB1 corresponding to the first private key PR1 may be included in the first certificate CT1.

In some embodiments, the secure element 650 may be equipped with a function of defending itself against an attack, such as a lab attack, from an external attacker. Therefore, the first certificate CT1, the public key CA_PB of the certificate authority, and the first private key PR1 may be securely stored in the secure element 650. The function of the secure element 650 defending itself may be implemented in various forms.

The processor 630 and the secure element 650 may be formed in one package. For example, the processor 630 and the secure element 650 may be provided as one package through system in package (SIP), through silicon via (TSV), multi chip package (MCP), package on package (POP), or the like.

The application processor 610 may be configured to store the public key CA_PB of the certificate authority, a second certificate CT2, which corresponds to the application processor 610 and is issued by the certificate authority, and a second private key PR2 of the application processor 610. A second public key PB2 corresponding to the second private key PR2 may be included in the second certificate CT2.

The sensor 640 may be configured to generate sensing data SSD, and provide the sensing data SSD to the processor 630.

In some embodiments, the sensor 640 may be a biometric sensor configured to detect biometric information. For example, the sensor 640 may be configured to detect a fingerprint, an iris pattern, a blood vessel pattern, a heart rate, a blood sugar, or the like, generate the sensing data SSD corresponding to the detected information, and provide the sensing data SSD to the processor 630. However, embodiments are not limited thereto, and the sensor 640 may include any kind of sensors, such as an illuminance sensor, an acoustic sensor, an acceleration sensor, or the like.

In some embodiments, the processor 630, the secure element 650, and the sensor 640 may be formed in one package.

The processor 630 and the secure element 650 may be configured to encrypt the sensing data SSD received from the sensor 640 and provide the encrypted sensing data to the application processor 610, and the application processor 610 may be configured to acquire the sensing data SSD by decrypting the encrypted sensing data received from the secure element 650. Therefore, a security level of a data transfer in the electronic device 600 may increase.

When the electronic device 600 performs encryption and decryption, the application processor 610 sets functions of the first SFRs 631 in the processor 630 using a control signal CTL, the first SFRs 631 provide the secure element 650 with the first setting signal STS1 and the selection signal SS through the first setting path SPTH1 and the first SFRs 631 provide the secure element 650 with the second setting signal STS1 through the second setting path SPTH2 according to data stored in the first SFRs 631.

Figure 11:
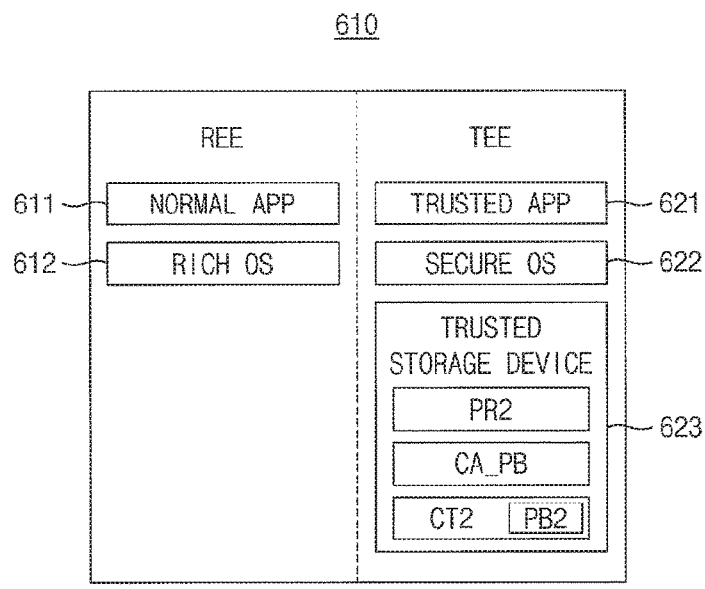
FIG. 11 is a block diagram illustrating the application processor in the electronic device of FIG. 10 according to some embodiments.

FIG. 11 is a block diagram illustrating the application processor in the electronic device of FIG. 10 according to some embodiments. Referring to FIGS. 10 and 11, the application processor 610 may include a trusted execution environment (TEE) and a rich operating system execution environment (REE). For example, the trusted execution environment (TEE) may be implemented with a TrustZone® by ARM®.

In the rich operating system execution environment (REE), a normal application 611 may operate on a normal operating system 612 such as Android®. In the trusted execution environment (TEE), a predetermined trusted application 621, which may communicate with the secure element 650, may operate on a secure operating system 622.

In addition, the application processor 610 may include a trusted storage device 623 operating on the trusted execution environment (TEE). For example, the trusted storage device 623 may be an electrically erasable programmable read-only memory (EEPROM), a flash memory, a phase change random access memory (PRAM), a resistance random access memory (RRAM), a nano floating gate memory (NFGM), a polymer random access memory (PoRAM), a magnetic random access memory (MRAM), a ferroelectric random access memory (FRAM), or the like.

The public key CA_PB of the certificate authority, the second certificate CT2, which corresponds to the application processor 610 and is issued by the certificate authority, and the second private key PR2 of the application processor 610 may be stored in the trusted storage device 623.

Since the trusted storage device 623 operates on the trusted execution environment (TEE), the trusted storage device 623 may be accessed by only the predetermined trusted application 621 operating on the trusted execution environment (TEE). That is, the normal application 611 operating on the rich operating system execution environment (REE) may not be able to access the trusted storage device 623.

Therefore, the predetermined trusted application 621 may securely acquire the sensing data SSD from the secure element 650 by performing the encryption and the decryption using the public key CA_PB of the certificate authority, the second certificate CT2, and the second private key PR2 stored in the trusted storage device 623.

Figure 12:
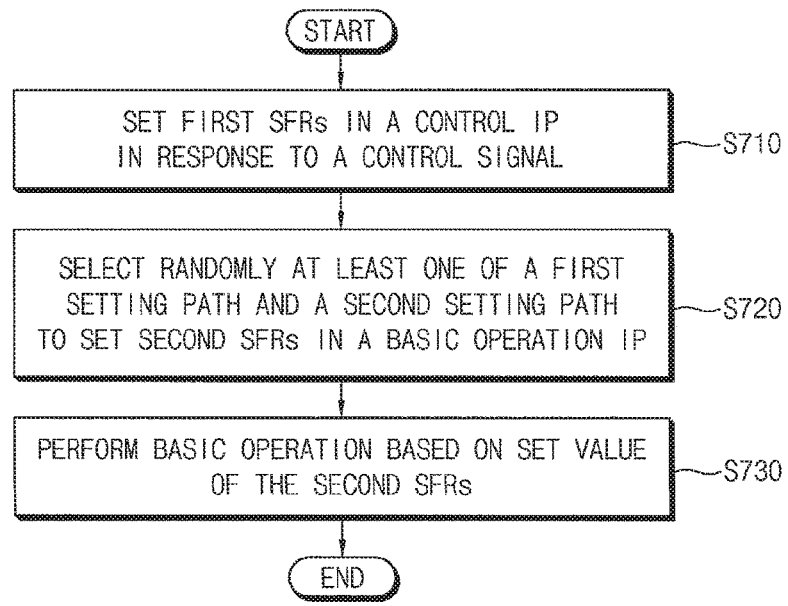
FIG. 12 is a flow chart illustrating a method of handling side channel attacks in an electronic device according to some embodiments.

FIG. 12 is a flow chart illustrating a method of handling side channel attacks in an electronic device according to some embodiments. Referring to FIGS. 1, 2, 6, 7 and 12, in a method of handling side channel attacks in the electronic device 10a that includes the control IP 300, the basic operation IP 400 connected to the control IP 300 via the bus 20, and the random number generator 500, the CPU 100 sets the functions of the first SFRs 310~3n0 in the control IP 300 using the control signal CTL (S710). The control IP 300 sets the functions of the second SFRs 411~41k in the basic operation IP 400 by randomly selecting at least one of the first set path SPTH1 directly connected to the basic operation IP 400 and the second set path SPTH which is connected to the basic operation IP 400 via the bus 20, in response to the random signal RS from the random number generator 500 (S720). The operation logic 430 in the basic operation IP 400 performs the basic operation according to the data stored in the second SFRs 411~41k (S730).

The control IP 300 may randomize the power pattern of the basic operation IP 400 in the setting intervals by randomly selecting at least one of the first setting path SPTH1 and the second setting path SPTH2 to set the functions of the second SFRs 411~41k. For example, in some embodiments, the control IP 300 may be configured to randomly select between the first setting path SPTH1 and the second setting path SPTH2. However, in other embodiments, the control IP 300 may be configured to randomly select from among the first setting path SPTH1, the second setting path SPTH2, and both the first setting path SPTH1 and the second setting path SPTH2. Therefore, the values of the secret keys, processed by the operation logic 430, are not exposed to the side channel attacks.

Figure 13:
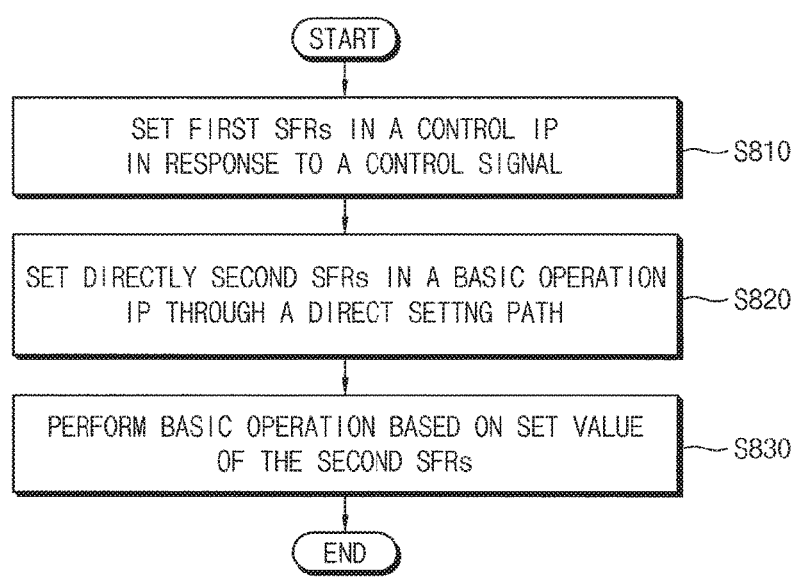
FIG. 13 is a flow chart illustrating a method of handling side channel attacks in an electronic device according to some embodiments.

FIG. 13 is a flow chart illustrating a method of handling side channel attacks in an electronic device according to some embodiments. Referring to FIGS. 8, 9 and 13, in a method of handling side channel attacks in the electronic device 10b that includes the control IP 300 and the basic operation IP 400 connected to the control IP 300 via the bus 20, the CPU 100 sets the functions of the first SFRs 310~3n0 in the control IP 300 using the control signal CTL (S810). The control IP 300 directly sets the functions of the second SFRs 411~41k in the basic operation IP 400 by using the first set path SPTH1 directly connected to the basic operation IP 400 (S820). The operation logic 430 in the basic operation IP 400 performs the basic operation according to the data stored in the second SFRs 411~41k (S830).

Since the functions of the second SFRs 411~41k in the basic operation IP 400 are simultaneously set, the values of the secret keys, processed by the operation logic 430, are not exposed to the side channel attacks.

Figure 14:
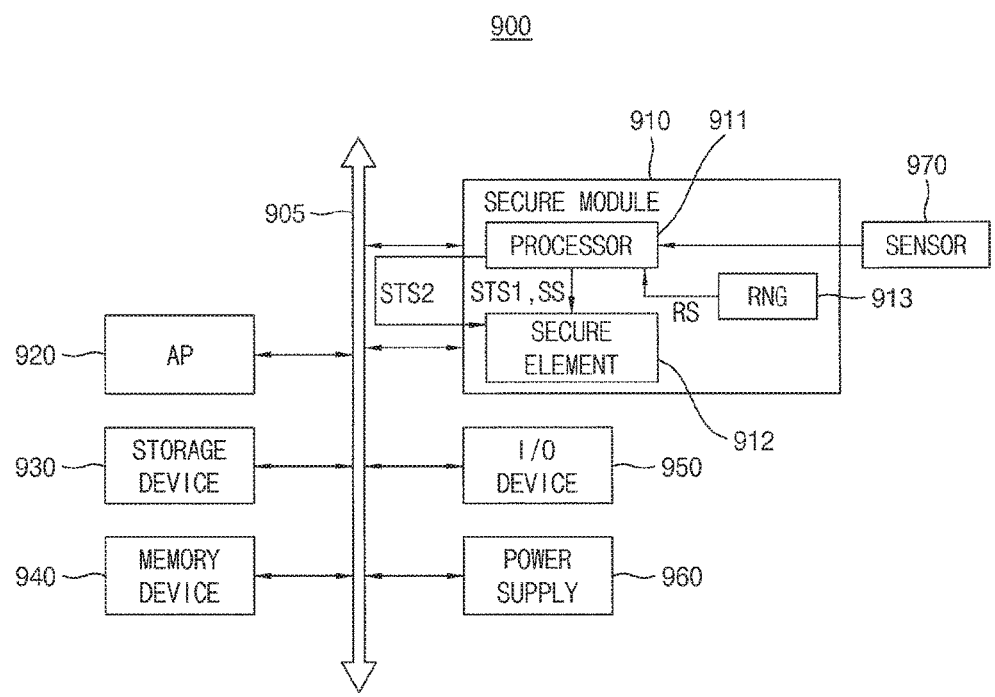
FIG. 14 is a block diagram illustrating an electronic system according to some embodiments.

FIG. 14 is a block diagram illustrating an electronic system according to some embodiments. Referring to FIG. 14, an electronic system 900 includes a secure module 910, an application processor 920, a storage device 930, a memory device 940, an input/output device 950, a power supply 960, and a sensor 970. Although it is not illustrated in FIG. 14, the electronic system 900 may further include ports that communicate with a video card, a sound card, a memory card, a universal serial bus (USB) device, or other electronic devices.

The application processor 920 may be configured to control overall operations of the electronic system 900. The application processor 920 may be configured to execute applications, such as a web browser, a game application, a video player, etc. In some embodiments, the application processor 920 may include a single core or multiple cores. For example, the application processor 920 may be a multi-core processor, such as a dual-core processor, a quad-core processor, a hexa-core processor, or the like. The application processor 920 may include an internal or external cache memory.

The secure module 910 includes a processor 911, a secure element 912 and a random number generator 913. The secure module 910, which includes the processor 911, the secure element 912 and the random number generator 913 may be formed in one package. The secure element 912 may be equipped with a function to defending itself against an attack, such as a lab attack, from an external attacker. Therefore, the secure element 912 may store security data securely. The processor 911 and the secure element 912 may be coupled to the bus 905.

The sensor 970 may be a biometric sensor configured to detect biometric information. For example, the sensor 970 may be configured to detect a fingerprint, an iris pattern, a blood vessel pattern, a heart rate, a blood sugar, or the like, generate sensing data corresponding to the detected information, and provide the sensing data to the processor 911 included in the secure module 910. However, embodiments are not limited thereto, and the sensor 970 may be any kind of sensors, such as an illuminance sensor, an acoustic sensor, an acceleration sensor, or the like.

The secure module 910, the application processor 920, and the sensor 970 included in the electronic system 900 of FIG. 14 may be implemented with the processor 630, the application processor 610, and the sensor 640 included in the electronic device 600 of FIG. 10. Since a structure and an operation of the secure module 910, the application processor 920, and the sensor 970 included in the electronic system 900 of FIG. 14 are described above with reference to FIG.

10, detailed description about the secure module 910, the application processor 920, and the sensor 970 will be omitted here.

The storage device 930 may be configured to store a boot image for booting the electronic system 900. For example, the storage device 930 may include a nonvolatile memory device such as a flash memory device, a solid state drive (SSD), etc.

The memory device 940 may be configured to store data required for an operation of the electronic system 900. For example, the memory device 940 may include a volatile memory device such as a dynamic random access memory (DRAM), a static random access memory (SRAM), or the like.

The input/output device 950 may include an input device such as a touch screen, a keypad, or the like, and an output device such as a speaker, a display device, or the like. The power supply 960 may be configured to supply operational power to the electronic system 900.

In some embodiments, the electronic system 900 may be arbitrary mobile systems, such as a mobile phone, a smart phone, a personal digital assistant (PDA), a portable multimedia player (PMP), a digital camera, a camcorder, a music player, a portable game console, a navigation system, a laptop computer, or the like.

Figure 15:
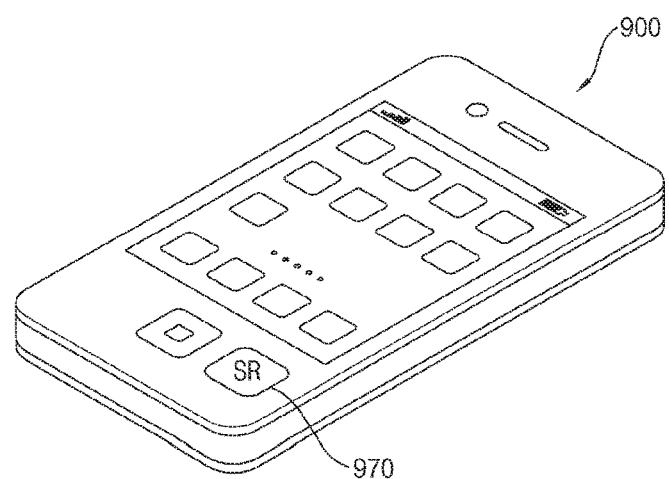
FIG. 15 is a diagram illustrating an example in which the electronic system of FIG. 14 is implemented as a smart phone.

FIG. 15 is a diagram illustrating an example in which the electronic system of FIG. 14 is implemented as a smart phone. Referring to FIGS. 14 and 15, the secure element 912 included in a smart phone 900a may be configured to store security data corresponding to biometric information of a user.

For example, if the sensor SR 970 included in the smart phone 900 is a fingerprint sensor, the security data stored in the secure element 912 may correspond to a fingerprint of the user. However, in other embodiments, a different sensor and corresponding security data may be present in the smart phone 900.

The smart phone 900 may be configured to determine whether a current user of the smart phone 900 is an allowed user of the smart phone 900. For example, the secure module 910, the application processor 920, and the sensor 970 included in the smart phone 900 may perform operations described above with reference to FIG. 10 such that sensing data, which is generated by the sensor 970, corresponding to a fingerprint of a current user may be securely transferred to the application processor 920 through the secure module 910.

In addition, when the secure module 910 performs encryption and decryption, the processor 911 may randomize the power pattern of the secure element 912 when the secure element performs the secure operation by randomly selecting one of a first setting path directly coupled to the secure element 912 and s second setting path coupled to the secure element 912 via the bus 905 to set the SFRs in the secure element 912, in response to the random signal RS from the random number generator 913. The processor 911 provides the secure element 912 with the first setting signal STS1 and the selection signal SS through the first setting path and provides the secure element 912 with the second setting signal STS2 through the second setting path.

Some embodiments are directed to provide an electronic device resistant to side channel attacks and capable of preventing security data from being exposed.

According to some embodiments, an electronic device resistant to side channel attacks, includes a control intellectual property (IP), a basic operation IP, a central processing unit (CPU) and a random number generator. The control IP includes multiple first special function registers (SFRs). The basic operation IP includes multiple second SFRs. The CPU is connected to the control IP and the basic operation IP through a bus. The CPU provides the first SFRs with a control signal that sets an operation of the control IP through the bus. The random number generator generates a random signal to the control IP. The control IP sets the second SFRs by randomly selecting one of a first setting path directly connected to the basic operation IP and a second setting path connected to the basic operation IP via the bus, in response to the random signal.

In some embodiments, the control IP may provide the basic operation IP with a first setting signal to set the second SFRs and a selection signal to select the first setting signal via the first setting path and may provide the basic operation IP with a second setting signal to set the second SFRs via the second setting path.

The basic operation IP may further include operation logic and multiple multiplexers. The operation logic may perform at least one basic operation of addition, subtraction and multiplication based on data stored in the second SFRs. The multiplexers may select one of the first setting signal and the second setting signal in response to the selection signal to provide the selected setting signal to the second SFRs.

The operation logic may perform the at least one basic operation in each of multiple operation valid intervals. The second SFRs may be set according to the selected setting signal in each of setting intervals. Each of the setting intervals may correspond to an interval between two consecutive operation valid intervals of the operation valid intervals.

The control IP may randomize a power pattern of the basic operation IP in the setting intervals by selecting randomly one of the first setting path and the second setting path and setting the second SFRs, in response to the random signal.

The first setting signal may include data associated with an operation of the operation logic. The second setting signal may include data associated with an operation of the operation logic and an address designating one of the second SFRs.

The second SFRs may be simultaneously set when the second SFRs are set through the first setting path.

In some embodiments, the control IP may further include a bus interface. The bus interface may convert the control signal to internal control signals conforming to a corresponding bus protocol and provides the internal control signals to the first SFRs.

According to some embodiments, an electronic device resistant to side channel attacks, includes a control intellectual property (IP), a basic operation IP, and a central processing unit (CPU). The control IP includes multiple first special function registers (SFRs). The basic operation IP includes multiple second SFRs. The CPU is connected to the control IP and the basic operation IP through a bus. The CPU may provide the first SFRs with a control signal that sets an operation of the control IP through the bus. The control IP sets functions of the second SFRs through a direct setting path directly connected to the basic operation IP.

In some embodiments, the basic operation IP may further include an operation logic. The basic operation IP may perform at least one basic operation of addition, subtraction and multiplication based on data stored in the second SFRs.

The operation logic may perform the at least one basic operation in each of multiple consecutive operation valid intervals.

The second SFRs may be simultaneously set according to a setting signal from the control IP in a setting interval prior to the operation valid intervals.

The control IP may directly set the second SFRs through the direct setting path such that the operation valid intervals are consecutive.

The basic operation IP may perform an encryption operation and decryption operation based on data stored in the second SFRs.

Accordingly, the electronic device may handle external side channel attacks by randomizing a setting path through which a setting signal to set functions of SFRs in a basic operation IP to randomize a power pattern of the basic operation IP.

The foregoing is illustrative of particular embodiments and is not to be construed as limiting of all embodiments. Although particular embodiments have been described, those skilled in the art will readily appreciate that many modifications are possible in the embodiments without materially departing from the novel teachings and advantages. Accordingly, all such modifications are intended to be included within the scope of the embodiments as defined in the claims. Therefore, it is to be understood that the foregoing is illustrative of particular embodiments and is not to be construed as limited to the particular embodiments disclosed, and that modifications to the particular embodiments, as well as other embodiments, are intended to be included within the scope of the appended claims.

What is claimed is:

1. An electronic device, comprising:
    a control intellectual property (IP) including a plurality of first special function registers (SFRs), values of the first SFRs setting an operation of the control IP;
    a basic operation IP including a plurality of second SFRs and coupled to the control IP through a first path and a second path, an operation of the basic operation IP being based on values of the second SFRs; and
    a processor configured to generate a random signal;
    wherein the control IP is configured to:
        select one of the first path and the second path based on the random signal; and
        set the values of the second SFRs based on the values of the first SFRs using the selected path,
        wherein a power pattern of the basic operation IP is randomized based on the random signal.

2. The electronic device of claim 1, wherein:
    the first path is a direct connection between the basic operation IP and the control IP; and
    the second path includes a bus.

3. The electronic device of claim 1, further comprising a central processing unit (CPU) connected to the control IP and the basic operation IP through a bus and configured to provide the first SFRs with a control signal that sets an operation of the control IP through the bus.

4. The electronic device of claim 3, wherein the control IP further includes a bus interface configured to convert the control signal to internal control signals conforming to a bus protocol and provide the internal control signals to the first SFRs.

5. The electronic device of claim 1, wherein the control IP is configured to provide the basic operation IP with a first setting signal to set the second SFRs based on the values of the first SFRs and a selection signal to select the first setting signal via the first path, and provide the basic operation IP with a second setting signal to set the second SFRs based on the values of the first SFRs via the second path.

6. The electronic device of claim 5, wherein the basic operation IP further comprises:
    an operation logic configured to perform at least one operation of addition, subtraction, and multiplication based on data stored in the second SFRs; and
    a plurality of multiplexers configured to select one of the first setting signal and the second setting signal in response to the selection signal to provide the selected setting signal to the second SFRs.

7. The electronic device of claim 6, wherein
    the operation logic is configured to perform the at least one operation in each of a plurality of operation valid intervals; and
    the basic operation IP is configured to set the second SFRs according to the selected setting signal in each of setting intervals, each of the setting intervals corresponding to an interval between two consecutive operation valid intervals of the operation valid intervals.

8. The electronic device of claim 6, wherein:
    the first setting signal includes data associated with an operation of the operation logic; and
    the second setting signal includes data associated with an operation of the operation logic and an address designating one of the second SFRs.

9. The electronic device of claim 5, wherein the basic operation IP is configured to set the values of the second SFRs simultaneously when the values of the second SFRs are set through the first path.

10. The electronic device of claim 5, wherein the basic operation IP is configured to set the values of the second SFRs sequentially when values of the second SFRs are set through the second path.

11. An electronic device, comprising:
    a bus;
    a control intellectual property (IP) including a plurality of first special function registers (SFRs), values of the first SFRs setting an operation of the control IP; and
    a basic operation IP including a plurality of second SFRs and coupled to the control IP through a bus and a direct setting path directly connected to the control IP and separate from the bus, an operation of the basic operation IP being based on values of the second SFRs;
    wherein a power pattern of the basic operation IP is randomized based on the values of the second SFRs,
    wherein the values of the first SFRs of the control IP set functions of the second SFRs through the direct setting path.

12. The electronic device of claim 11, wherein the basic operation IP further comprises an operation logic configured to perform at least one operation of addition, subtraction and multiplication based on data stored in the second SFRs.

13. The electronic device of claim 12, wherein the operation logic is configured to perform the at least one operation in each of a plurality of consecutive operation valid intervals.

14. The electronic device of claim 13, wherein the basic operation IP is configured to set the values of the second SFRs simultaneously according to a setting signal from the control IP in a setting interval prior to the operation valid intervals.

15. The electronic device of claim 13, wherein the control IP is configured to directly set the values of the second SFRs through the direct setting path such that the operation valid intervals are consecutive.

16. The electronic device of claim 12, wherein the basic operation IP is configured to perform an encryption operation and decryption operation based on the values stored in the second SFRs.

17. The electronic device of claim 12, further comprising a central processing unit (CPU) connected to the control IP and the basic operation IP through the bus and configured to provide the first SFRs with a control signal that sets an operation of the control IP through the bus.

18. An electronic device, comprising:
   a control intellectual property (IP) including a plurality of first special function registers (SFRs), values of the first SFRs setting an operation of the control IP; and
   a basic operation IP including a plurality of second SFRs and coupled to the control IP through a first path and a second path, an operation of the basic operation IP being based on values of the second SFRs; and
   wherein the control IP is configured to:
      randomly generate a selection signal;
      select at least one of the first path and the second path based on the random signal; and
      set the values of the second SFRs based on the values of the first SFRs using the selected at least one of the first path and the second path,
      wherein a power pattern of the basic operation IP is randomized based on the random signal.

19. The electronic device of claim 18, wherein:
   the control IP is further configured to:
      generate a selection signal; and
      transmit the selection signal to the basic operation IP through the first path; and
   the basic operation IP is configured to set the values of the second SFRs based on the selection signal.

* * * * *